United States Patent [19]
Winzen

[11] Patent Number: 5,987,871
[45] Date of Patent: Nov. 23, 1999

[54] OPEN-END SPINNING DEVICE WITH A SPINNING ROTOR

[75] Inventor: Lothar Winzen, Heinsberg, Germany

[73] Assignee: W. Schlafhorst AG & Co., Moenchengladbach, Germany

[21] Appl. No.: 09/112,903

[22] Filed: Jul. 9, 1998

[30] Foreign Application Priority Data

Jul. 9, 1997 [DE] Germany ............................ 197 29 191

[51] Int. Cl.⁶ .................................................... D01H 4/00
[52] U.S. Cl. ................................ 57/406; 57/404; 310/90.5
[58] Field of Search ..................... 57/404, 406; 384/610; 310/90.5

[56] References Cited

U.S. PATENT DOCUMENTS

| | | | |
|---|---|---|---|
| 3,747,998 | 7/1973 | Klein et al. ............................. | 308/10 |
| 5,622,040 | 4/1997 | Preutenborbeck et al. ............... | 57/406 |
| 5,720,160 | 2/1998 | Taxler et al. ............................. | 57/76 |
| 5,887,417 | 3/1999 | Derichs ..................................... | 57/406 |

FOREIGN PATENT DOCUMENTS

| | | |
|---|---|---|
| 270459 | 4/1969 | Germany . |
| 22 06 237 | 8/1973 | Germany . |
| 22 48 695 | 4/1974 | Germany . |
| 25 14 734 A1 | 10/1976 | Germany . |
| 26 34 070 | 2/1978 | Germany . |
| 2639763 | 3/1978 | Germany ............................. 57/406 |
| 30 47 606 A1 | 9/1991 | Germany . |
| 44 36 831 A1 | 6/1995 | Germany . |
| 195 42 079 A1 | 6/1996 | Germany . |
| 6-185526 | 7/1994 | Japan . |

*Primary Examiner*—William Stryjewski
*Attorney, Agent, or Firm*—Kennedy Covington Lobdell & Hickman, LLP

[57] ABSTRACT

An open-end spinning device has a spinning rotor (3) supported by its rotor shaft (4) in the bearing nip of a support-disk bearing (5) and positioned by a magnetic thrust bearing (18). The magnetic thrust bearing (18) comprises a stationary bearing component (41) with permanent-magnet rings (42, 43) which are enclosed by pole disks (44, 45, 46) and a replaceably arranged bearing component formed of ferromagnetic annular attachments (32, 33, 34) arranged on the rotor shaft (4) which rotate with the spinning rotor. The rotor shaft (4) comprises on one end a bearing area (35) with offset diameter and with at least three ferromagnetic annular elements (32, 33, 34) arranged at the spacing of the pole disks (44, 45, 46), with the ferromagnetic annular elements being optimized as regards their design and arrangement.

18 Claims, 4 Drawing Sheets

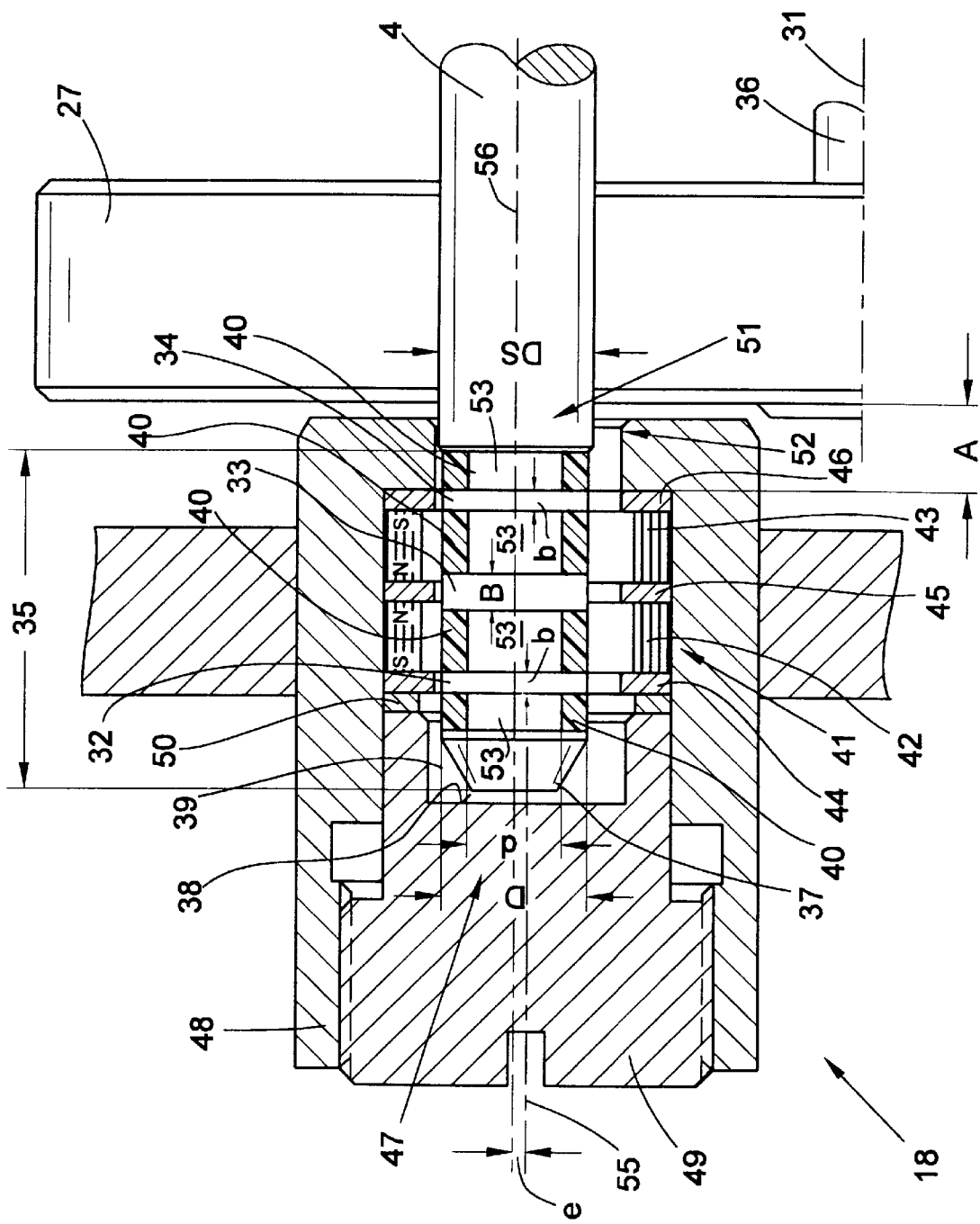

OPEN-END SPINNING DEVICE WITH A SPINNING ROTOR

BACKGROUND OF THE INVENTION

The present invention relates generally to open-end spinning devices equipped with a spinning rotor.

Spinning units are known in connection with open-end rotor spinning machines in which units the spinning rotor is supported for high speed rotation by its rotor shaft in the bearing slot of a support-disk arrangement and is fixed via a mechanical thrust bearing arranged on one end. The support-disk arrangement has two support-disk pairs mounted on shafts which are angled relative to one another such that an axial thrust is exerted on the rotor shaft to hold the rotor shaft in contact with the mechanical thrust bearing. This type of bearing for open-end spinning rotors is described for example in German Patent Publication DE-OS 25 14 734, and has been shown to operate effectively in practice at rotor speeds of greater than 100,000 rpms.

However, this type of spinning-rotor bearing has the disadvantage that increased friction occurs between the peripheral bearing surfaces of the support disks and the rotor shaft on account of the angled relationship of the support disks, which results in a heating of the contact surfaces of the support disks. Not only are the contact surfaces of the support disks considerably stressed by this frictional heat but additional energy is also necessary to overcome this friction. Moreover, the mechanical thrust bearings are subjected to a not inconsiderable wear, even if properly lubricated.

Therefore, attempts have already be made in the past to replace these mechanical thrust bearings by wear-free thrust bearings, e.g. pneumatic bearings or magnetic bearings. Since an axial thrust of the rotor shaft in the direction of the thrust bearing is also required in the case of pneumatic bearings, most of the above-discussed basic problems are not able to be eliminated with pneumatic bearings.

German Patent Publication DE 195 42 079 A1 describes an axial magnetic-bearing arrangement in which a part of the magnetic bearing elements are arranged stationarily in the housing of a thrust bearing and the other part of the magnetic bearing elements are arranged in a detachable manner on the rotor shaft of the spinning rotor. Various embodiments are suggested regarding the connection of the magnetic bearing elements rotating with the spinning rotor to the rotor shaft. A few of these variants concerns a non-positive fastening and others a positive fastening of the rotating magnetic bearing elements, which can be readily detached if necessary. A correct axial fixing of the rotor shaft on the support-disk bearing arrangement is possible with these known magnetic bearing devices and it is also assured that the spinning rotor can be smoothly mounted and dismounted if necessary. However, while the non-positive, easily detachable fastening of the magnetic bearing component to the rotor shaft is advantageous in principle, this type of bearing device is still in need of improvement. A particular problem in such magnetic bearing devices is the fastening of the rotating magnetic bearing elements to the rotor shaft since substantial requirements are placed on the balance quality of this connection on account of the high speed of the spinning rotor.

An open-end rotor spinning device with a permanent magnetic thrust bearing is also known from Austrian Patent 270,459. In this bearing arrangement, ferromagnetic annular attachments are arranged on the end of the rotor shaft of a spinning rotor and are opposed by pole elements of a permanent magnet pivotably supported in this area. The bundling of the magnetic lines of force of the permanent magnet achievable by such an arrangement results in a relatively stiff fixing of the rotor shaft in the bearing nip of a support-disk bearing. However, a magnetic bearing arrangement designed in this manner has the disadvantage that the annular attachments arranged on the rotor shaft have a distinctly greater diameter than the rotor shaft itself. Since these larger annular attachments may prevent the mounting and dismounting of the spinning rotor, especially its front-side mounting, or at least make this operation considerably more difficult, this known magnetic bearing arrangement has not been accepted in practice.

German Patent Publication DE 30 47 606 A1 teaches a bearing for a spindle of a textile machine which rotates at a relatively high speed. The spindle is supported in the radial direction via a three-point bearing arrangement similar to a support-disk bearing and is secured in the axial direction by a magnetic bearing. One end of the spindle comprises a bearing area stepped in its diameter with two ferromagnetic annular attachments. A muff manufactured from a non-magnetic material is fixed to the bearing housing as a stationary bearing element and an annular permanent-magnet element enclosed by lateral pole disks is fitted into which muff. In the mounted state of the spindle the ferromagnetic annular attachments of the spindle shaft stand opposite the pole disks of the permanent-magnet element fixed in the stationary bearing element. Even though this known design makes possible a relatively smooth mounting and dismounting of the spindle in an axial direction, the device has not been accepted in practice on account of its deficient axial bearing stiffness.

SUMMARY OF THE INVENTION

In view of the state of the art described above, it is an object of the present invention to improve the known magnetic thrust bearing arrangements for spinning rotors. In particular, an optimization of the known bearings should increase their stiffness or rigidity to the extent that they can be used without problems even at speeds clearly over 100,000 rpms, during which a smooth mounting and dismounting of the spinning rotor must nevertheless be assured.

The present invention solves this problem by an open-end spinning device which basically comprises a spinning rotor having a rotor shaft and a bearing arrangement for supporting the rotor shaft which comprises a support-disk bearing defining a nip for receiving the rotor shaft and a magnetically-operative thrust bearing for retaining an end of the rotor shaft. In accordance with the present invention, the thrust bearing comprises a stationary bearing component having at least two permanent-magnet rings disposed between and in alternation with at least three pole disks with respective like-directional poles of the permanent-magnet rings oriented in opposition to one another and a rotating bearing component comprising ferromagnetic annular elements attached to the rotor shaft at the end thereof to be removable and replaceable in common with the rotor shaft. In particular, the end of the rotor shaft has a bearing area of a diameter less than the diameter of the rotor shaft and the rotating bearing component comprising at least three ferromagnetic annular elements disposed about the bearing area and spaced apart by intervening sections of the rotor shaft at spacings corresponding to the pole disks. According to the invention, one of the ferromagnetic annular elements is disposed most closely adjacent the support-disk bearing at a spacing therefrom between approximately 1 mm and 15 mm, each of the ferromagnetic annular elements has a diameter greater than the intervening sections of the rotor shaft in the range of between 1.2:1 and 4.5:1, and each of the ferromagnetic annular elements having an axial dimension between approximately 0.5 mm and 3 mm.

The design of the magnetic thrust bearing in accordance with the present invention with at least three ferromagnetic annular attachments in the bearing area of the rotor shaft, which are optimized in their dimensions and positioning as described, in combination with corresponding pole disks which enclose at least two stationarily mounted permanent-magnet elements arranged so that poles of the same magnetic direction oppose each other in the mounted state of the bearing, results in a wear-free and maintenance-free thrust bearing which is also very stiff at high rotational speeds sufficient to permit speed of greater than 100,000 rpm to be achieved.

The spinning rotor, which is supported in known manner by its rotor shaft in the bearing nip of a support-disk bearing, thereby remains readily replaceable, i.e., as is known for mechanical thrust bearings, whereby the spinning rotor can, if needed, be smoothly dismounted to the front after the opening of the rotor housing and can also be smoothly mounted again from the front.

The magnetic thrust bearing may be advantageously arranged closely behind the support-disk arrangement, whereby the overall length of the rotor shaft can be kept short in spite of a relatively long axial-bearing area, which has an extremely positive effect during operation in reducing the oscillating behavior of the open-end spinning device and therewith on the utilizable speed level of the device. The distance of the ferromagnetic annular element attached inwardmost on the shaft from the adjacent rearmost support disk of the support-disk bearing arrangement should therefore not exceed 15 mm with the rotor shaft mounted in place. This distance should preferably be between 4 and 6 mm.

An optimal design of the thrust bearing of the invention is achieved if, in addition, the diametric ratio between the ferromagnetic annular attachments and the sections of the rotor shaft arranged in front of and behind the ferromagnetic annular elements is between 1.2:1 and 4.5:1, preferably 1.5:1 to 2:1. Also, the width of the ferromagnetic annular elements should not exceed 0.5 to 3 mm in the interest of a maximum bundling of the lines of force of the permanent magnet elements. Narrower or wider annular attachments or pole disks result in a decrease of the stiffness of the thrust bearing.

According to one embodiment of the invention, the middle, i.e., the intermediate, one of the three ferromagnetic annular elements has a greater width (i.e., axial dimension) than the two outside annular elements. As a result of the greater width of the middle annular elements, the magnetic forces, which are greatest in the area of the middle pole disk arranged between the two permanent magnet elements, are optimally bundled and serve to axially fix the rotor shaft.

In an alternative embodiment, it can be provided that all ferromagnetic annular elements have the same width (i.e., axial dimension). Even such a design yields a thrust bearing with a relatively great stiffness.

In a further development of the invention, the width (i.e., axial dimension) of the individual pole disk corresponds to the width of the particular opposing ferromagnetic annular attachment. The width of the components is thereby preferably minimized until a magnetic saturation of the ferromagnetic material of these components occurs on account of the bundling of the magnetic lines of force.

It is further advantageous if all pole disks have the same width, since such a design reduces the number of different components without significant negative effects on the stiffness of the magnetic thrust bearing. The width of the pole disks preferably corresponds, even in an embodiment with ferromagnetic annular attachments of different widths, to the width of the outside annular attachments.

It is preferred that the rotor shaft comprises on one end a bearing area with a head portion whose diameter preferably corresponds to the diameter of the ferromagnetic annular attachments. The head portion is tapered toward the end of the rotor shaft by a relatively large chamfer, whereby the head portion is rendered safe. Such a design considerably facilitates the mounting insertion of the rotor shaft into the stationary housing of the thrust bearing. Moreover, such a design can prevent a damaging of the contact surfaces of the support disks during the insertion of the rotor shaft into the bearing nip of the support-disk bearing.

Any such damaging of the contact surfaces of the support-disk bearing during the insertion of the rotor shaft is also counteracted by an embodiment wherein a continuously smooth end of the rotor shaft is created by utilizing a non-magnetic material, e.g. plastic or aluminum, to fill in the shaft sections arranged between the ferromagnetic annular elements and the shaft sections in front of and behind the annular elements which are set off in diameter. This particular area of the rotor-shaft is of course subjected in this instance to an appropriate post-treatment following the infilling operation.

The stationary bearing component of the magnetic thrust bearing, which is formed by the two annular permanent-magnet elements and the pole disks surrounding them is advantageously arranged in a muff-like bearing housing which is completed by a screw-like closure element. Both the bearing housing and the closure element, which can be axially adjusted with respect to the bearing housing on account of a screw connection, are manufactured from a non-magnetic material, e.g. brass or aluminum. Such an embodiment not only makes possible a reliable and precise fixing of the stationary bearing component but an appropriate selection of material also assures that no disturbance of the magnetic flux of force occurs. A further advantageous development of the invention can provide that the central axis of the bearing housing is arranged at a somewhat downward offset relative to the central axis of the rotor shaft. This arrangement assures that the magnetic thrust bearing always imparts a force component to the rotor shaft in the direction of the arrangement of the support-disk bearing so that the rotor shaft is always reliably held in a simple manner in the bearing nip of the mechanical support-disk bearing.

Preferably, the closure element defines a recess for surrounding the head portion of the rotor shaft with a bottom surface of the recess acting as an axial stop and an annular wall surface of the recess acting as a radial stop for the head portion of the rotor shaft. In addition, the thrust-bearing housing has a through axial bore adjacent the support-disk bearing for receiving and radially protecting the rotor shaft. This embodiment yields on the one hand an axial stop for the rotor shaft and on the other hand a radial protection against being run up against for the ferromagnetic annular attachments and the pole disks arranged opposite. Since the inside diameter of the recess in the closing element is clearly smaller than the inside diameter of the pole disks, this assures that the rotor shaft can not run against the pole disks, even if an imbalance occurs.

The axial stop formed by the bottom surface of the recess of the closing element and by the head part of the rotor shaft makes it possible that an exact axial positioning of the rotor shaft within the thrust bearing does not have to be taken into consideration during the mounting of the spinning rotor. Rather, it is sufficient if the spinning rotor is inserted with its rotor shaft into the thrust bearing until the head part of one end strikes against the bottom surface of the recess. The magnetic forces of the thrust bearing then automatically assure a functionally correct positioning of the end of the rotor shaft in the thrust bearing and therewith an exact alignment of the spinning-rotor shaft on the support-disk bearing.

Further details, features and advantages of the present invention will be understood from an exemplary embodiment described below with reference to the accompanying drawings.

BRIEF DESCRIPTION OF THE DRAWINGS

FIG. 4 is a cross-section similar to FIG. 3 depicting another embodiment of the thrust bearing of the present invention.

DESCRIPTION OF THE PREFERRED EMBODIMENT

Figure 1:
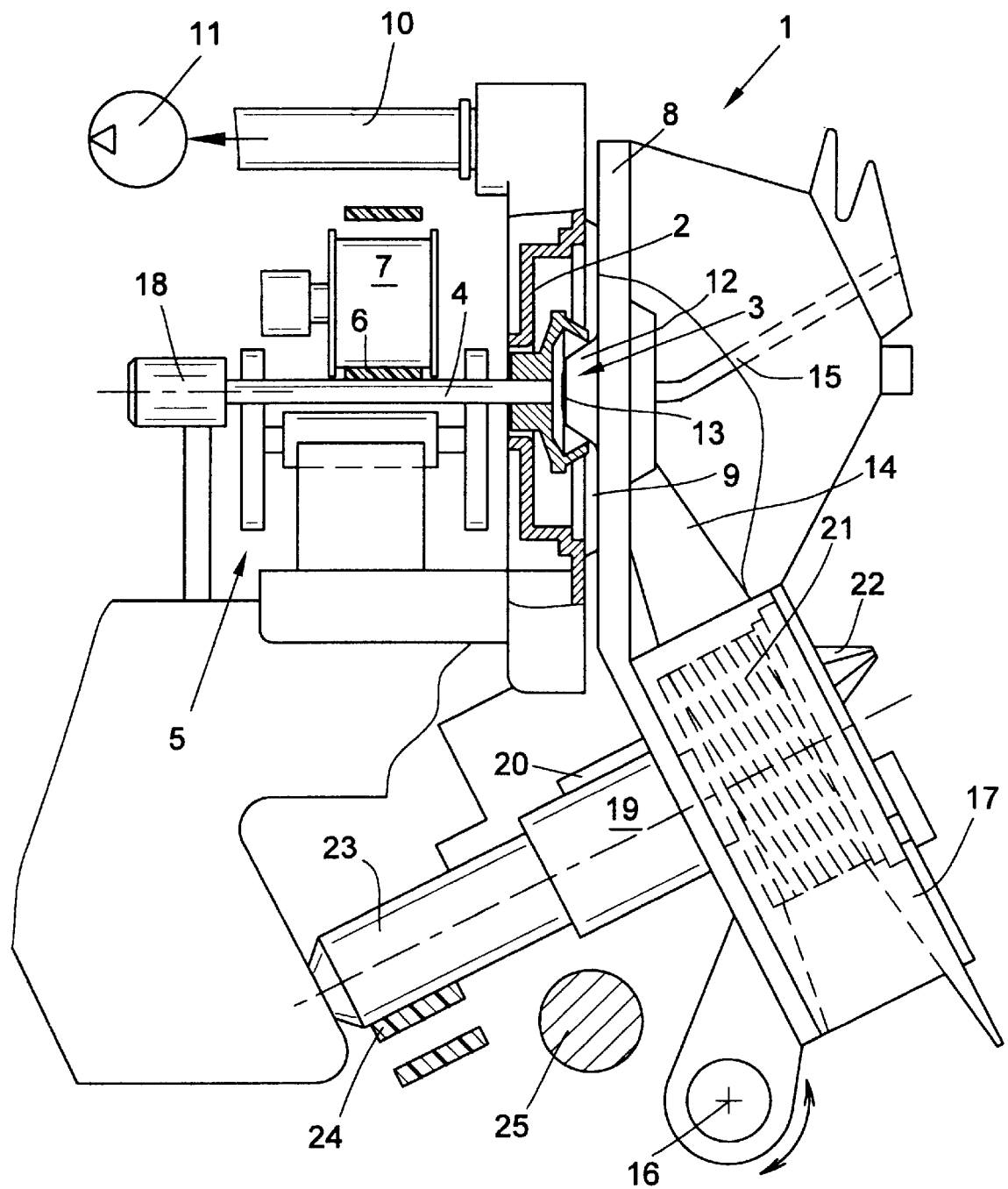
FIG. 1 is a side elevation, partially in cross-section, of an open-end spinning device with a spinning rotor supported by its rotor shaft in the bearing nip of a support-disk bearing and positioned via a magnetic thrust bearing on one end, in accordance with the present invention.

Referring now to the accompanying drawings and initially to FIG. 1, an open-end spinning unit is indicated in its entirety at 1. As is known, the spinning unit 1 has a rotor housing 2 in which a spinning cup of a spinning rotor 3 rotates at a high speed. Spinning rotor 3 is mounted on a rotor shaft 4 which is supported in a bearing nip area of a support-disk bearing 5 and is loaded by a tangential belt 6 under the adjusting influence of a pressure roller 7 which extends the length of the machine. The rotor shaft 4 is fixed axially via a permanent magnetic thrust bearing 18 shown in detail in FIGS. 2 and 3.

As is customary, rotor housing 2 is open to the front and is closed during operation by a pivotably mounted cover element 8 into which a conduit plate (not shown in more detail) with a seal 9 is fitted. The rotor housing 2 is also connected via an appropriate suction line 10 to a vacuum source 11 which produces a vacuum in the rotor housing 2 necessary for spinning.

A conduit-plate adapter 12 is arranged in the cover element 8 and supports a yarn withdrawal nozzle 13 and the mouth area of fiber delivery conduit 14. A yarn withdrawal tube 15 connects to the yarn withdrawal jet 13. An opening-cylinder housing 17 is also fixed on the cover element 8, which is mounted so that it can pivot in a limited manner about a pivot pin 16. Cover element 8 also has bearing brackets on its back side for mounting an opening cylinder 21 and a sliver intake cylinder 22. Opening cylinder 21 is driven in the area of its axial shaft 23 by a traveling tangential belt 24 running the length of the machine whereas the drive (not shown) of sliver intake cylinder 22 preferably takes place via a worm gear arrangement connected to a drive shaft 25 running the length of the machine.

Figure 2:
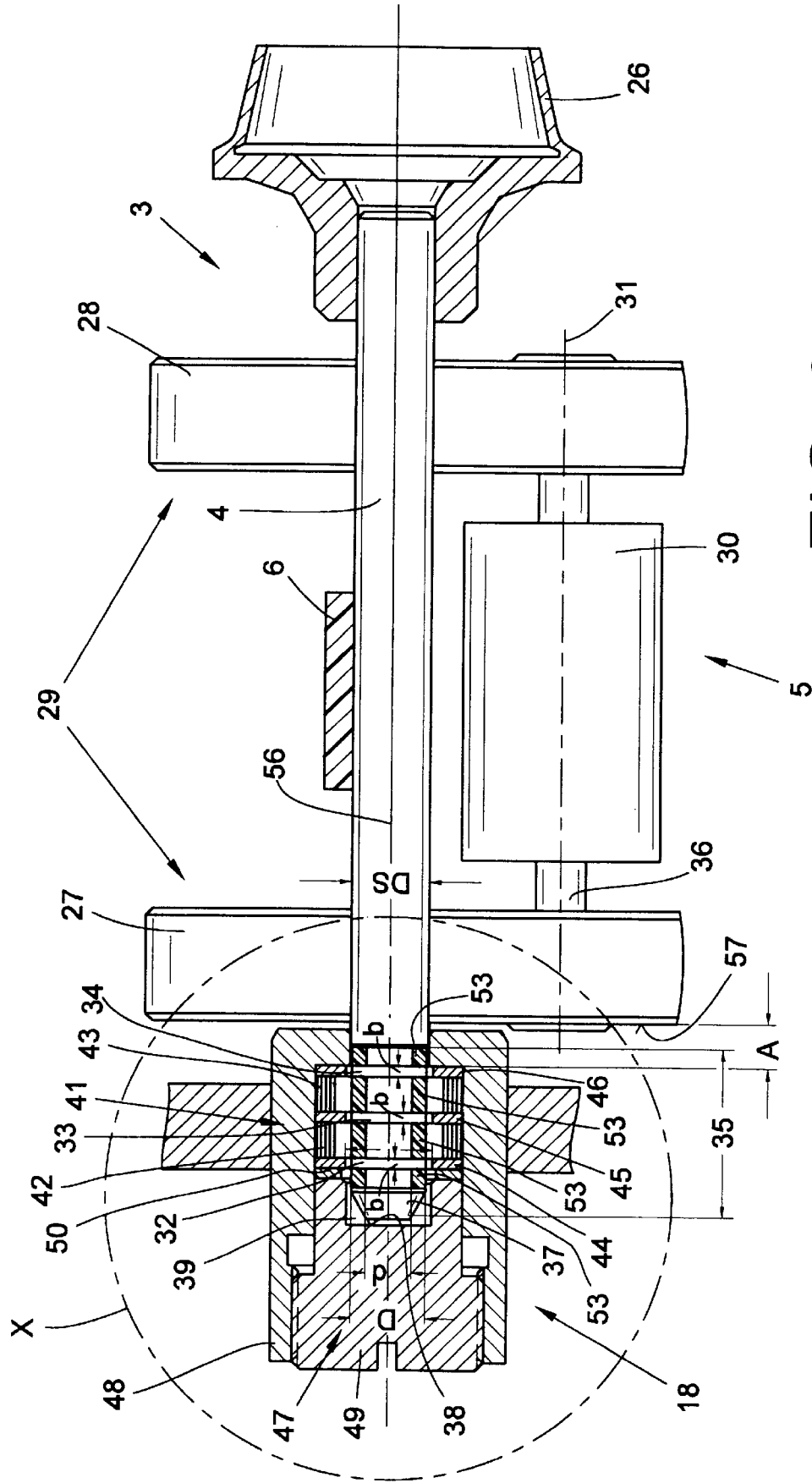
FIG. 2 is a more enlarged side elevation of the radial bearing of the rotor shaft of FIG. 1, with the permanent magnetic thrust bearing in cross-section.

FIG. 2 shows the bearing of open-end spinning rotor 3 in greater detail including an axial thrust bearing 18 shown in section. As is indicated, spinning rotor 3, consisting of spinning cup 26 and rotor shaft 4, is supported by its rotor shaft 4 in a peripheral nip area of a support-disk bearing designated in its entirety by 5. As is known, such support-disk bearings 5 have two support-disk pairs whose axes 31 extend parallel to one another. For the sake of clarity only the rear support-disk pair 29 with its support disks 27, 28 is shown in FIG. 2. Support disks 27, 28 are fixed on common shaft 36 which rotates in an anti-friction rolling bearing arrangement 30.

Figure 3:
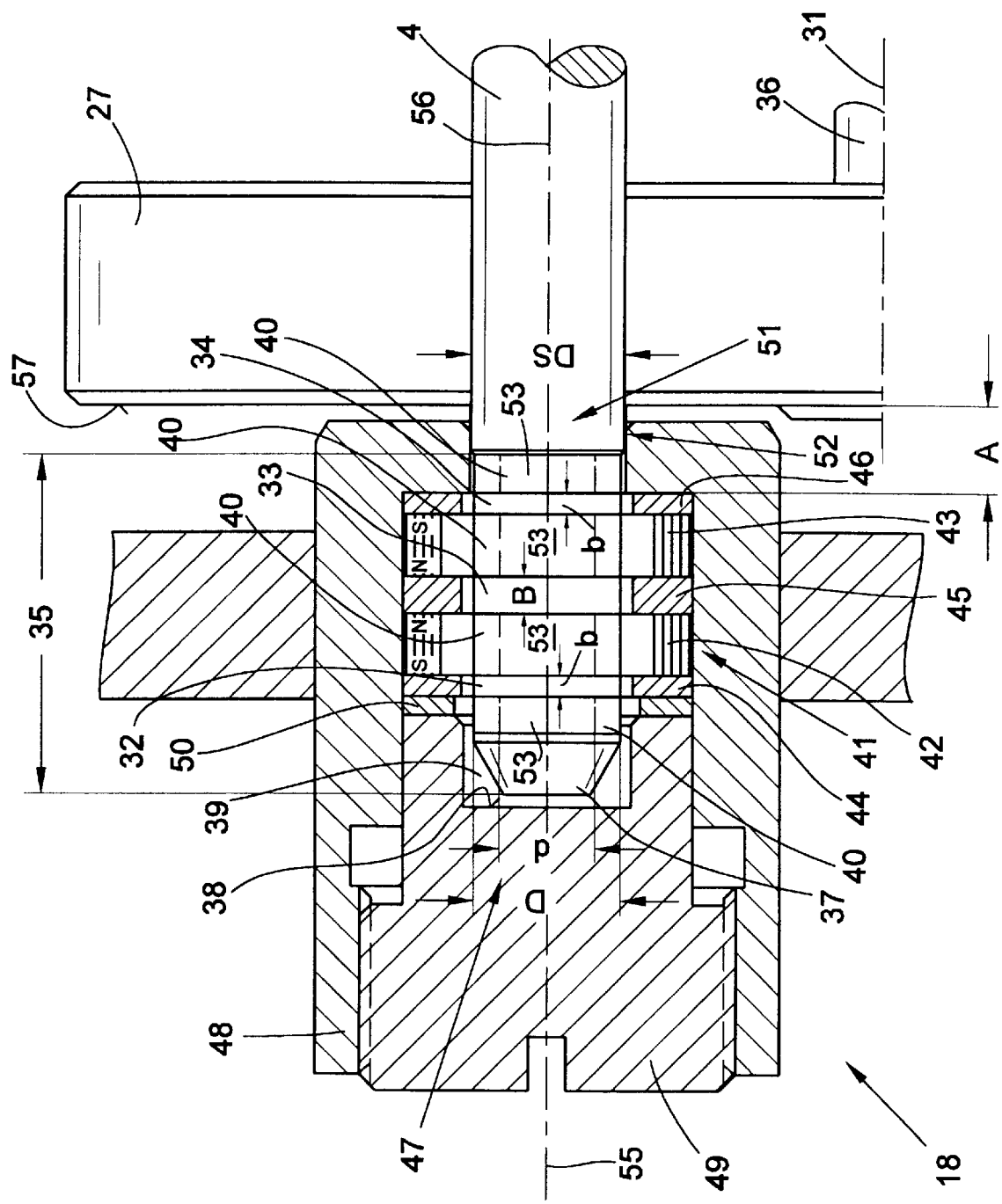
FIG. 3 is a cross-section of an alternative embodiment of the thrust bearing of the present invention on a further enlarged scale.

As is indicated in FIGS. 2, 3 and 4, rotor shaft 4 has a bearing area 35 on one end which area is somewhat reduced in its diameter D in comparison to the normal rotor-shaft diameter DS. Rotor shaft 4 has three ferromagnetic annular attachments 32, 33, 34 in this bearing area 35, the diameter of which ferromagnetic annular attachments is, as already indicated previously, somewhat reduced from diameter DS of rotor shaft 4.

The width (i.e. the axial dimension taken lengthwise relative to the shaft 4) of ferromagnetic annular attachments 32, 33, 34 is preferably selected in such a manner that, as is best shown in FIGS. 3 and 4, the central annular attachment 33 has a greater width B than the adjacent annular attachments 32, 33, whose width is b. The optimal width B and b of the annular attachments is between 0.5 and 3 mm. However, in an alternative embodiment represented in FIG. 2, the three annular attachments 32, 33, 34 can also have the same width b.

The terminal end of rotor shaft 4 is formed as a head portion 37 which is received in a recess 39 of a closing element 49 to serve, in conjunction with bottom surface 38 of recess 39 in closing element 49, both as an axial stop and a radial stop.

Bearing area 35 of rotor shaft 4 is preferably jacketed annularly with a non-magnetic material 40 about the shaft sections 53 located between annular attachments 32, 33, 34 and/or in front of and behind these annular attachments. That is, shaft sections 53 between and/or in front of and behind ferromagnetic annular attachments 32, 33, 34 are remetalled, lined, covered or otherwise filled in with plastic or aluminum. After such filling in, the bearing area 35 is reworked to provide a smooth rotor-shaft end with a constant diameter D.

The thrust bearing 18 has a stationary bearing component 41 which consists essentially of permanent-magnet rings 42, 43 enclosed and spaced by pole disks 44, 45, 46 all mounted in an axial bore 47 of a muff-like bearing housing 48 and fixed in place by a closing element 49 pressing on a non-magnetic intermediate disk 50. The arrangement of permanent-magnet rings 42, 43 is selected so that in the mounted state of such magnet rings 42, 43 their respective poles magnetized in the same direction North/North or South/South oppose each other.

The head portion 37 of rotor shaft 4 is chamfered to form, in conjunction with bottom surface 38 of recess 39 in closing element 49, not only an axial stop for rotor shaft 4, so that the exact axial positioning of rotor shaft 4 on support-disk bearing arrangement 5 is facilitated, but also at the same time a radial protection against contact with pole disks 44, 45, 46. That is, it is reliably prevented that ferromagnetic annular attachments 32, 33, 34 can make mechanical contact with pole disks 44, 45, 46 by virtue of an inside diameter of recess 39 which is somewhat less than the inside diameter of pole disks 44, 45, 46.

Protection against undesired contact of ferromagnetic annular attachments 32, 33, 34 against pole disks 44, 45, 46 can also be avoided by forming arranged in the area of through bore 51. In this instance the inside diameter of through bore 51 of bearing housing 48 to be slightly larger than diameter DS of rotor shaft 4 but distinctly less than the inside diameter of pole disks 44, 45, 46.

As FIGS. 2 to 4 show, magnetic thrust bearing 18 is located relatively close behind support-disk bearing arrangement 5 at a spacing A of the innermost ferromagnetic annular attachment 34 (and opposing pole disk 46 of stationary thrust-bearing component 41) from the rearwardmost bearing disk 27, which should not exceed 15 mm and preferably should be between 4 and 6 mm.

It has been determined that a maximum stiffness of thrust bearing 18 is achieved if the diametric ratio between ferromagnetic annular attachments 32, 33, 34 and adjacent shaft sections 53 is between 1.2/1 and 4.5/1; the greatest stiffness of the thrust bearing is achieved at diametric ratios of D/d between 1.5/1 and 2/1.

It is indicated in FIG. 4 that central axis 55 of thrust-bearing housing 48 can be offset downward by a dimension e relative to central axis 56 of rotor shaft 4. Such an offset arrangement of thrust-bearing housing 48 has the result that a magnetic force field develops in the area of thrust bearing 18 whose downwardly directed force component predominates slightly. Consequently, the end of the rotor shaft 4 is additionally loaded or urged in the direction of the bearing nip of the support-disk bearing under the influence of this force component.

The magnetic thrust bearing of the invention represents, as a unit, a wear-free, easily dismountable bearing device which has a sufficiently great axial stiffness even at rotor speeds far above 100,000 rpm/minute. Moreover, since the thrust bearing in accordance with the invention operates without lubrication, oil contaminations like those which occasionally occur in conjunction with mechanical thrust bearings are reliably excluded.

What is claimed is:

1. An open-end spinning device comprising a spinning rotor having a rotor shaft and bearing arrangement for supporting the rotor shaft, the bearing arrangement comprising a support-disk bearing defining a nip for receiving the rotor shaft and a magnetically-operative thrust bearing for retaining an end of the rotor shaft, the thrust bearing comprising a stationary bearing component having at least two permanent-magnet rings disposed between and in alternation with at least three pole disks with respective like-directional poles of the permanent-magnet rings oriented in opposition to one another and a rotating bearing component comprising ferromagnetic annular elements attached to the rotor shaft at the end thereof to be removable and replaceable in common with the rotor shaft, the end of the rotor shaft having a bearing area of a diameter less than the diameter of the rotor shaft and the rotating bearing component comprising at least three ferromagnetic annular elements disposed about the bearing area and spaced apart by intervening sections of the rotor shaft at spacings corresponding to the pole disks, one of the ferromagnetic annular elements being disposed most closely adjacent the support-disk bearing at a spacing therefrom between approximately 1 mm and 15 mm, each of the ferromagnetic annular elements having a diameter greater than the intervening sections of the rotor shaft in the range of between 1.2:1 and 4.5:1, and each of the ferromagnetic annular elements having an axial dimension between approximately 0.5 mm and 3 mm.

2. The open-end spinning device according to claim 1, characterized in that the axial dimension of the intermediate one of the three ferromagnetic annular elements is greater than the axial dimensions of the outer ferromagnetic annular elements.

3. The open-end spinning device according to claim 1, characterized in that each of the three ferromagnetic annular elements have the same axial dimension.

4. The open-end spinning device according to claim 1, characterized in that the axial dimension of each of the pole disks corresponds to the axial dimension of the respective ferromagnetic annular element.

5. The open-end spinning device according to claim 1, characterized in that each of the pole disks have the same axial dimension.

6. The open-end spinning device according to claim 1, characterized in that the bearing area of the rotor shaft has a head portion.

7. The open-end spinning device according to claim 6, characterized in that the head portion of the rotor shaft has a shape to facilitate insertion of the rotor shaft into the stationary bearing component of the thrust bearing.

8. The open-end spinning device according to claim 1, characterized in that the intervening shaft sections of the bearing area between the ferromagnetic annular elements are jacketed with a non-magnetic material.

9. The open-end spinning device according to claim 1, characterized in that the thrust bearing comprises a bearing housing in which the stationary bearing component of the thrust bearing is arranged and a closure element for the bearing housing, both the bearing housing and the closure element being of a non-magnetic material.

10. The open-end spinning device according to claim 9, characterized in that the bearing housing defines a central axis offset by a predetermined dimension relative to an axis defined by the rotor shaft.

11. The open-end spinning device according to claim 9, characterized in that the closure element defines a recess for surrounding the head portion of the rotor shaft.

12. The open-end spinning device according to claim 11, characterized in that the closure element defines a bottom surface of the recess for acting as an axial stop for the head portion of the rotor shaft.

13. The open-end spinning device according to claim 11, characterized in that the closure element defines an annular wall surface of the recess for acting as a radial stop for the head portion of the rotor shaft.

14. The open-end spinning device according to claim 1, characterized in that the thrust-bearing comprising a bearing housing having a through axial bore adjacent the support-disk bearing for receiving and radially protecting the rotor shaft.

15. The open-end spinning device according to claim 1, characterized in that the one of the ferromagnetic annular elements disposed most closely adjacent the support-disk bearing is spaced therefrom between approximately 4 mm and 6 mm.

16. The open-end spinning device according to claim 1, characterized in that each of the ferromagnetic annular elements has a diameter greater than the intervening sections of the rotor shaft in the range of between 1.5:1 and 2:1.

17. An open-end spinning device comprising a spinning rotor having a rotor shaft, the rotor shaft including a rotating bearing component comprising ferromagnetic annular elements attached to the rotor shaft at the end thereof to be removable and replaceable in common with the rotor shaft, the end of the rotor shaft having a bearing area of a diameter less than the diameter of the rotor shaft and the rotating bearing component comprising at least three ferromagnetic annular elements disposed about the bearing area and spaced apart by intervening sections of the rotor shaft.

18. The open-end spinning device of claim 17, wherein the spinning rotor further includes a bearing arrangement for supporting the rotor shaft, the bearing arrangement comprising a support disk bearing defining a nip for receiving the rotor shaft and a magnetically-operative thrust bearing for retaining an end of the rotor shaft, one of the ferromagnetic annular elements being disposed most closely adjacent the support-disk bearing at a spacing therefrom between approximately 1 mm and 15 mm, each of the ferromagnetic annular elements having a diameter greater than the intervening sections of the rotor shaft in the range of between 1.2:1 and 4.5:1, and each of the ferromagnetic annular elements having an axial dimension between approximately 0.5 mm and 3 mm.

* * * * *